(12) United States Patent
Brust et al.

(10) Patent No.: US 9,057,407 B2
(45) Date of Patent: Jun. 16, 2015

(54) DISCONNECT ASSEMBLY

(71) Applicants: Eric A. Brust, Machesney Park, IL (US); Ted A. Martin, Byron, IL (US)

(72) Inventors: Eric A. Brust, Machesney Park, IL (US); Ted A. Martin, Byron, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 179 days.

(21) Appl. No.: 13/686,324

(22) Filed: Nov. 27, 2012

(65) Prior Publication Data

US 2014/0144743 A1    May 29, 2014

(51) Int. Cl.
*F16D 9/02*    (2006.01)
*F16D 11/14*    (2006.01)

(52) U.S. Cl.
CPC .. *F16D 9/02* (2013.01); *F16D 11/14* (2013.01)

(58) Field of Classification Search
CPC ............ F16D 9/02; F16D 11/14; F16D 43/25
USPC ............................................ 192/69.8; 464/31
See application file for complete search history.

(56) References Cited

U.S. PATENT DOCUMENTS

| 4,042,088 A * | 8/1977 | Schmohe .................. 192/114 R |
| 4,271,947 A * | 6/1981 | Gaeckle ..................... 192/82 T |
| 4,384,859 A | 5/1983 | Teramachi |
| 4,405,041 A | 9/1983 | Broadbent |
| 4,746,320 A | 5/1988 | Kilwin |
| 4,913,276 A | 4/1990 | Hayashi et al. |
| 4,934,977 A * | 6/1990 | Falconer et al. ................. 464/31 |
| 5,103,949 A * | 4/1992 | Vanderzyden et al. .......... 192/24 |
| 5,201,393 A | 4/1993 | Takeuchi et al. |
| 6,364,772 B1 * | 4/2002 | Sugden ............................ 464/31 |
| 7,004,296 B2 | 2/2006 | Heiartz et al. |
| 7,104,376 B2 | 9/2006 | Sudau |
| 7,171,868 B2 | 2/2007 | Buckman et al. |
| 7,598,642 B2 | 10/2009 | Scherzinger et al. |
| 2011/0148234 A1 | 6/2011 | Lemmers, Jr. et al. |
| 2011/0175475 A1 | 7/2011 | Makino et al. |
| 2012/0067689 A1 | 3/2012 | Eastman |

FOREIGN PATENT DOCUMENTS

| EP | 1784581 B1 | 7/2010 |
| EP | 2337188 A2 | 6/2011 |
| WO | 2006091230 A2 | 8/2006 |

* cited by examiner

*Primary Examiner* — Richard Lorence
(74) *Attorney, Agent, or Firm* — Cantor Colburn LLP

(57) ABSTRACT

A disconnect assembly is provided and includes a rotatably drivable input shaft including a first clutch portion, a rotating element including a second clutch portion, which is movable between a first position, at which the first and second clutch portions drivably register with each other, and a second position, at which the first and second clutch portions are displaced from each other and a disconnect bearing. The disconnect bearing is disposed at an inner diameter of the first clutch portion and configured to radially and axially secure the input shaft relative to the rotating element with the second clutch portion disposed in the first or second position.

18 Claims, 2 Drawing Sheets

DISCONNECT ASSEMBLY

BACKGROUND OF THE INVENTION

The subject matter disclosed herein relates to a disconnect assembly of a rotating machine and, more particularly, to a disconnect assembly of a rotating machine with an internally packaged bearing.

Typically, rotating machines such as generators are driven directly or by way of engine gearboxes or other driving elements via a rotatable input shaft. The rotation of this input shaft is transferred to a main rotation shaft within the rotating machine by a clutch and when the clutch is disengaged, the transfer of rotation from the input shaft to the main rotation shaft is prevented.

Normally, the portion of the input shaft extending into the rotating machine is supported by a disconnect bearing disposed on an outer diameter of the input shaft. In this position, the disconnect bearing drives a sizing envelope of the overall system, has high operational velocities and cannot be lubricated efficiently. This leads to correspondingly large overall systems that have relatively short service lifetimes.

BRIEF DESCRIPTION OF THE INVENTION

According to one aspect of the invention, a disconnect assembly is provided and includes a rotatably drivable input shaft including a first clutch portion, a rotating element including a second clutch portion, which is movable between a first position, at which the first and second clutch portions drivably register with each other, and a second position, at which the first and second clutch portions are displaced from each other and a disconnect bearing. The disconnect bearing is disposed at an inner diameter of the first clutch portion and configured to radially and axially secure the input shaft relative to the rotating element with the second clutch portion disposed in the first or second position.

According to another aspect of the invention, a disconnect assembly is provided and includes a rotatably drivable input shaft including a first clutch portion, a rotating element including a second clutch portion, which is movable between a first position, at which the first and second clutch portions drivably register with each other, and a second position, at which the first and second clutch portions are displaced from each other, a controller configured to move the second clutch portion from the first to the second position and a disconnect bearing. The disconnect bearing is disposed at an inner diameter of the first clutch portion and configured to radially and axially secure the input shaft relative to the rotating element.

According to yet another aspect of the invention, a disconnect assembly of a rotating machine is provided. The disconnect assembly includes a rotatably drivable input shaft including a first clutch portion, a rotating element including a second clutch portion, which is movable between a first position, at which the rotating element clutch portion drivably registers with the input shaft clutch portion, and a second position, at which the rotating element clutch portion is displaced from the input shaft clutch portion, an elastic element configured to bias the rotating element clutch portion toward the second position and/or tooth angles that generate separating forces when transmitting torque, a containment element configured to force the rotating element clutch portion to resist the bias applied by the elastic element and/or the thrust loads in accordance with first operational conditions and to permit the rotating element clutch portion to be movable in response to the bias applied by the elastic element and/or the thrust loads in accordance with second operational conditions and a disconnect bearing. The disconnect bearing is disposed at an inner diameter of the input shaft clutch portion and configured to radially and axially secure the input shaft relative to the rotating element.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In accordance with aspects, a disconnect assembly is provided in which a disconnect bearing is moved to an inner diameter of an input shaft within a rotating machine. This arrangement leads to a more compact overall design, reduces sliding velocities of the bearing and provides for lubrication of the bearing as well.

Figure 1:
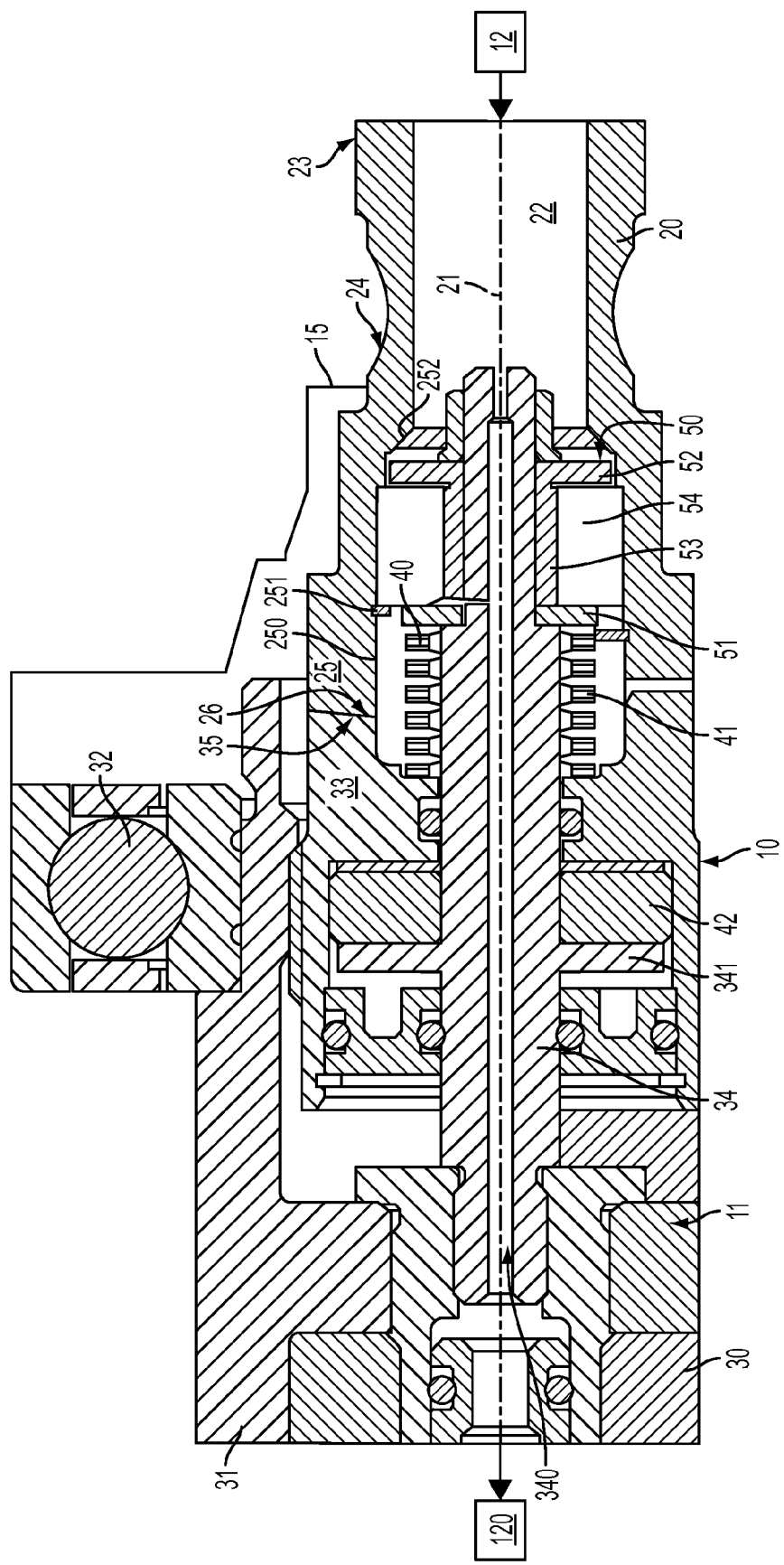
FIG. 1 is a side view of a disconnect assembly in which first and second clutch portions are drivably registered with each other in accordance with embodiments.
Figure 2:
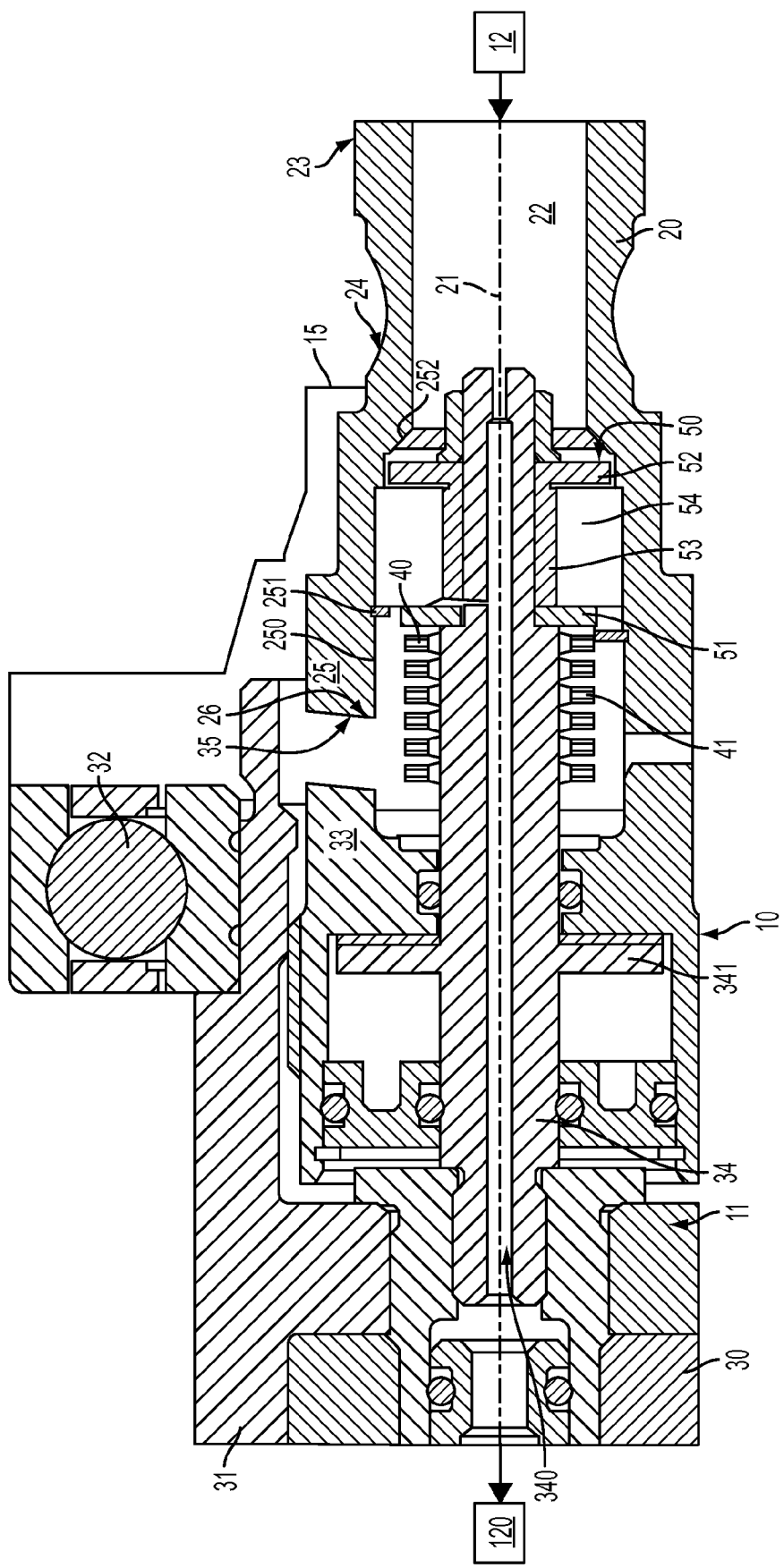
FIG. 2 is a side view of a disconnect assembly in which first and second clutch portions are displaced from each other in accordance with embodiments.

With reference to FIGS. 1 and 2, a disconnect assembly 10 is provided for use with a rotating machine 11 or generator 120 that is drivable directly or indirectly by way of an engine gearbox 12. The rotating machine 11 or generator 120 is housed within a sealable housing 15. The disconnect assembly 10 includes an input shaft 20, a rotating element 30, a controller 40 and a disconnect bearing 50. The input shaft 20 is coupled to the engine gearbox 12 and is rotatable about axis 21 when driven to do so by the engine gearbox 12. The input shaft 20 may be generally hollow with an interior 22, a first portion 23 and a second portion 24. The first portion 23 is connectable with the engine gearbox 12. The second portion 24 extends from the first portion 23 into the housing 15 of the rotating machine 11. The input shaft 20 includes an input shaft clutch portion (hereinafter referred to as a "first clutch portion") 25 disposed along the second portion 24.

The first clutch portion 25 may be formed with a plurality of teeth 26 or other similarly interlockable features and includes an inner diameter surface 250, a retaining tab 251 and a tapered portion 252. The tapered portion 252 leads to the inner diameter surface 250 and the retaining tab 251 extends radially inwardly from the inner diameter surface 250.

The rotating element 30 includes a main rotation shaft 31, which is rotatably supported within the housing 15 by a main rotor bearing 32, a rotation element clutch portion (hereinafter referred to as "a second clutch portion") 33, an inner shaft 34 and various seal elements. The second clutch portion 33 is rotatably coupled to the main rotation shaft 31 such that main rotation shaft 31 rotates with the second clutch portion 33 and is formed with features (e.g., teeth 35) that complement the teeth/interlockable features of the first clutch portion 25. Further, the second clutch portion 33 is movable between a first position (see FIG. 1) and a second position (see FIG. 2).

As shown in FIG. 1, when the second clutch portion 33 is disposed in the first position, the complementary interlockable features (i.e., the teeth 26, 35) of the first and second clutch portions 25 and 33 drivably register with each other such that rotation of the input shaft 20 is transferable to the first clutch portion 25, the second clutch portion 33 and finally to the main rotation shaft 31. As shown in FIG. 2, when the second clutch portion 33 is disposed in the second position, the first and second clutch portions 25 and 33 are displaced from each other such that rotation of the input shaft 20 is not transferable to the main rotation shaft 31.

The inner shaft 34 is rotatably disposed within the main rotation shaft 31 and is formed to define an oil feed line 340 running along a longitudinal axis thereof. The inner shaft 34 may be further provided with a flange 341.

The controller 40 is configured to move the second clutch portion 33 from the first position to the second position. To this end, the controller 40 may include an elastic element 41 and a containment element 42 and further the teeth 26, 35 on the first and second clutch portions 25 and 33 may be angled. The elastic element 41 may be provided as a compression spring anchored to the disconnect bearing 50 and is configured to apply a bias to the second clutch portion 33 that is directed toward the second position. As such, the elastic element 41 is configured to force the second clutch portion 33 away from the position whereby rotation of the input shaft 20 is transferable to the main rotation shaft 31. The teeth 26, 35 on the first and second clutch portions 25 and 33 may have an included angle that generates a separating thrust load when transmitting torque. The containment element 42 may be provided as a solder element and is disposed in the region partially bounded by surfaces of the second clutch portion 33, the inner shaft 34 and the flange 341.

Thus, in accordance with first conditions being in effect, the containment element 42 is axially braced by the flange 341 and thereby pushes against the second clutch portion 33 in opposition to the bias applied by the elastic element 41 and tooth 26, 35 thrust loads. As such, the containment element 42 prevents the second clutch portion 33 from moving from the first position to the second position. By contrast and, in accordance with second conditions being in effect, the containment element 42 may be configured to permit the movement of the second clutch portion 33 toward the second position. The first conditions may be characterized by operational temperatures in and around the containment element 42 being insufficient to melt the containment element 42. Conversely, the second conditions may be characterized by operational temperatures in and around the containment element 42 being sufficient to melt the containment element.

The operational temperatures may be within normal parameters or elevated in response to an operation of a generator 120. For example, when the generator 120 runs hot due to a failure mode of some type, the excessive heat of the generator 120 may be sufficient to raise the operational temperatures of the rotating machine 11 which can cause overheating and damage to the rotating machine. The material of the containment element 42 is selected to having a melting point below the operational temperatures at which such overheating and damage occur. Thus, as the operational temperatures rise, the containment element 42 acting as a stop-gap measure melts and can no longer hold the second clutch portion 33 in the first position. The second clutch portion 33 therefore moves to the second position due to the bias applied by the elastic element 41 and/or the tooth 26, 35 thrust loads from first and second clutch portions 25 and 33 and prevents the rotation of the input shaft 20 from being transferred to the main rotation shaft 31. This, in turn, prevents further overheating and damage to the rotating machine 11.

The disconnect bearing 50 is disposed within the annulus defined between the inner shaft 34 and the inner diameter surface 250. In this position, the disconnect bearing 50 is configured to radially secure the input shaft 20 relative to the rotating element 30 by bracing the input shaft 20 against an outer diameter of the inner shaft 34. The disconnect bearing 50 is further configured to axially secure the input shaft 20 relative to the rotating element 30 by fitting between the tapered portion 252 and the retaining tab 251. The disconnect bearing 50 includes a radially oriented forward thrust bearing 51, a radially oriented aft thrust bearing 52, an axially oriented sleeve bearing 53 and a journal disconnect bearing 54. The journal disconnect bearing 54 is disposed in a region partially bounded by the forward thrust bearing 51, the aft thrust bearing 52, the sleeve bearing 53 and the inner diameter surface 250.

With the disconnect bearing 50 disposed within the annulus defined between the inner shaft 34 and the inner diameter surface 250, bearing velocities at the interface of the disconnect bearing 50 and the inner diameter surface 250 are reduced as compare to the bearing velocities exhibited by conventional disconnect bearings disposed a the outer diameter of the input shaft. Moreover, where the inner shaft 34 is formed to define the oil feed line 340, oil or another type of lubrication may be deliverable to the disconnect bearing 50 by way of the oil feed line 340 and the interior 22 of the input shaft 20. Thus, the disconnect bearing 50 may be lubricated.

In accordance with further aspects of the invention, a method of operating the disconnect assembly 10 as described above is provided. Once the containment element 42 melts and the second clutch portion 33 is moved to the second position, the generator 120 may be disabled. Then, once the input shaft 20 stops rotating, the second clutch portion 33 can be forced back to the first position. At this point, the containment element 42 may be replaced and then the generator 120 can be re-engaged.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A disconnect assembly, comprising:
   a housing;
   a rotatably drivable input shaft including a first portion, a second portion extending from the first portion into the housing and a first clutch portion disposed along the second portion;
   a rotating element housed within the housing and including a second clutch portion, which is movable between a first position, at which the first and second clutch portions drivably register with each other, and a second position, at which the first and second clutch portions are displaced from each other; and
   a disconnect bearing disposed at an inner diameter of the first clutch portion and configured to radially and axially secure the input shaft relative to the rotating element with the second clutch portion disposed in the first or second position, the disconnect bearing comprising a sleeve bearing, forward and aft thrust bearings respectively disposed at forward and aft ends of the sleeve bearing and a journal disconnect bearing disposed in a region partially bounded by the forward and aft thrust bearings, the sleeve bearing and the inner diameter of the first clutch portion.

2. The disconnect assembly according to claim 1, wherein the rotating element comprises a main shaft of a rotating machine.

3. The disconnect assembly according to claim 1, further comprising:

an elastic element configured to bias the second clutch portion toward the second position and tooth angles that generate thrust loads when transmitting torque; and a containment element configured to force the second clutch portion to resist the elastic element bias and the thrust loads in accordance with first conditions and to permit the second clutch portion to be movable in response to the elastic element bias and the thrust loads in accordance with second conditions.

4. The disconnect assembly according to claim 3, wherein the elastic element comprises a compression spring anchored to the disconnect bearing.

5. The disconnect assembly according to claim 3, wherein the containment element comprises a solder element.

6. The disconnect assembly according to claim 3, wherein the first conditions are characterized by operational temperatures insufficient to melt the containment element and the second conditions are characterized by operational temperatures sufficient to melt the containment element.

7. The disconnect assembly according to claim 1, wherein the disconnect bearing is lubricated.

8. The disconnect assembly according to claim 1, further comprising an inner shaft about which the disconnect bearing is disposed, the inner shaft being formed to define a cavity by which lubricant is deliverable to the disconnect bearing.

9. A disconnect assembly, comprising:

a housing;

a rotatably drivable input shaft including a first portion, a second portion extending from the first portion into the housing and a first clutch portion disposed along the second portion;

a rotating element housed within the housing and including a second clutch portion, which is movable between a first position, at which the first and second clutch portions drivably register with each other, and a second position, at which the first and second clutch portions are displaced from each other;

a controller configured to move the second clutch portion from the first to the second position; and a disconnect bearing disposed at an inner diameter of the first clutch portion and configured to radially and axially secure the input shaft relative to the rotating element, the disconnect bearing comprising a sleeve bearing, forward and aft thrust bearings respectively disposed at forward and aft ends of the sleeve bearing and a journal disconnect bearing disposed in a region partially bounded by the forward and aft thrust bearings, the sleeve bearing and the inner diameter of the first clutch portion.

10. The disconnect assembly according to claim 9, wherein the rotating element comprises a main shaft of a rotating machine.

11. The disconnect assembly according to claim 9, wherein the controller comprises:

an elastic element configured to bias the second clutch portion toward the second position and tooth angles that generate separating forces when transmitting torque; and a containment element configured to force the second clutch portion to resist the elastic element bias and the separating forces in accordance with first conditions and to permit the second clutch portion to be movable in response to the elastic element bias and the separating forces in accordance with second conditions.

12. The disconnect assembly according to claim 11, wherein the elastic element comprises a compression spring anchored to the disconnect bearing.

13. The disconnect assembly according to claim 11, wherein the containment element comprises a solder element.

14. The disconnect assembly according to claim 11, wherein the first conditions are characterized by operational temperatures insufficient to melt the containment element and the second conditions are characterized by operational temperatures sufficient to melt the containment element.

15. The disconnect assembly according to claim 9, wherein the disconnect bearing is lubricated.

16. The disconnect assembly according to claim 9, further comprising an inner shaft about which the disconnect bearing is disposed, the inner shaft being formed to define a cavity by which lubricant is deliverable to the disconnect bearing.

17. A disconnect assembly of a rotating machine, comprising:

a housing;

a rotatably drivable input shaft including a first portion, a second portion extending from the first portion into the housing and a first clutch portion disposed along the second portion;

a rotating element housed within the housing and including a second clutch portion, which is movable between a first position, at which the second clutch portion drivably registers with the first clutch portion, and a second position, at which the second clutch portion is displaced from the first clutch portion;

an elastic element configured to bias the second clutch portion toward the second position and tooth angles that generate separating forces when transmitting torque;

a containment element configured to force the second clutch portion to resist the bias applied by the elastic element and the separating forces in accordance with first operational conditions and to permit the second clutch portion to be movable in response to the bias applied by the elastic element and the separating forces in accordance with second operational conditions; and a disconnect bearing disposed at an inner diameter of the first clutch portion and configured to radially and axially secure the input shaft relative to the rotating element, the disconnect bearing comprising a sleeve bearing, forward and aft thrust bearings respectively disposed at forward and aft ends of the sleeve bearing and a journal disconnect bearing disposed in a region partially bounded by the forward and aft thrust bearings, the sleeve bearing and the inner diameter of the first clutch portion.

18. The disconnect assembly of a rotating machine according to claim 17, further comprising a generator configured to be coupled to the input shaft.

* * * * *